Patented June 27, 1939

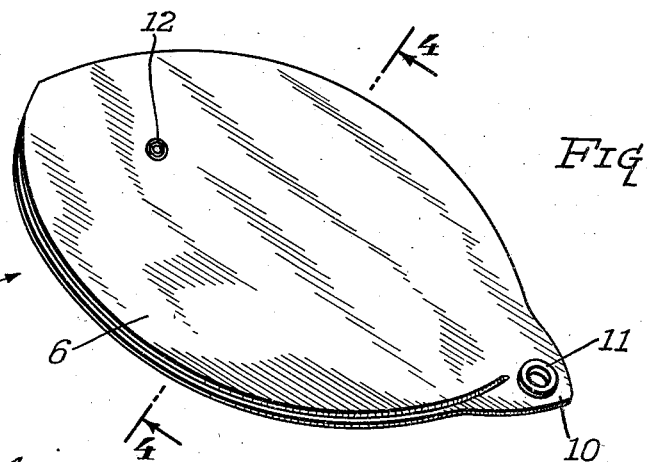
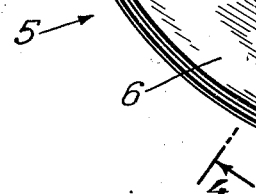
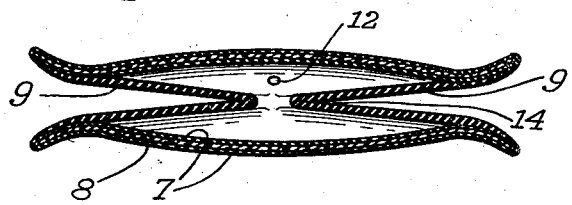
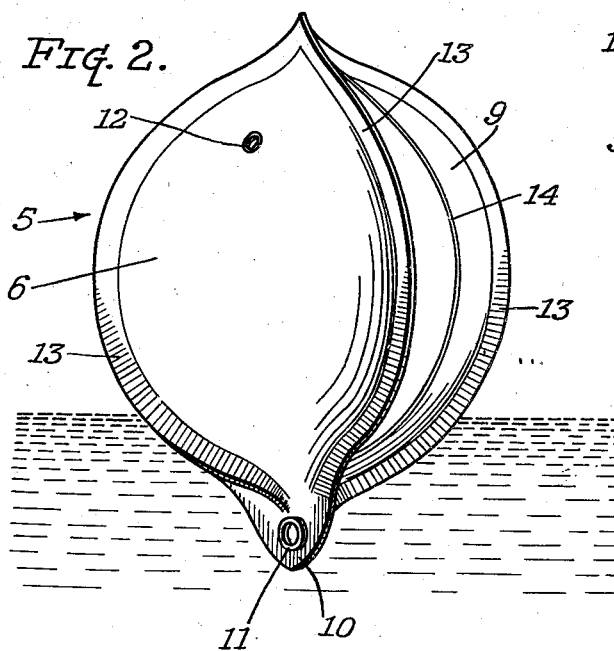
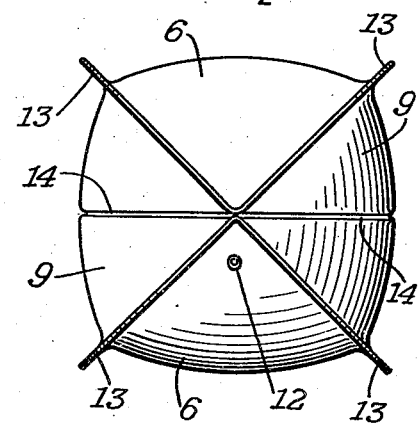
CHARLES N. MERRALLS
INVENTOR.
BY Joseph F. Westall
ATTORNEY.

2,163,795

UNITED STATES PATENT OFFICE 2,163,795

FLOAT

Charles N. Merralls, Los Angeles, Calif.

Application December 14, 1936, Serial No. 115,670

10 Claims. (Cl. 9—8)

This invention relates generally to floats of the class adapted to render buoyancy to objects desired to be supported in or above water, and particularly to support and indicate the presence of partially submerged fishing equipment and the like.

The stationary nets employed in fishing are usually partially submerged in a definite position by sinkers to provide an opening for the fish to enter and a large area within the net. The edges of the nets are supported at the surface by cork or other buoyant material. Being submerged, their boundaries are not always easily seen, and in navigable waters are often run into by boats, which is not only highly objectionable to the navigators, but often results in the loss of the catch to the fisherman, as well as destruction of the net, or in expensive time-consuming repair jobs.

In such fishing operations the size of the catch depends to a great extent upon the efficiency of the floats in sustaining the edges of the nets at the surface. Cork floats of practicable size and many well known type floats of the prior art to which my invention appertains are many times not sufficiently buoyant to maintain the edges of a net at the surface of rough or rolling waters. Consequently, the waves and swells in passing over rather than through the net afford an avenue of escape for the fish.

It is a principal object of this invention to provide a collapsible float of slight body weight adapted for inflation by gaseous fluids such as air, and capable of sustaining a weight substantially equal to the difference in the weight of the fluid in which it is to be utilized and the fluid introduced therein, to enable the float, in normal use, to protrude above the water as a buoy to indicate the presence of the objects to which it is attached or is supporting.

Another object is the provision of a container comprising a hermetically sealed collapsible rubber sphere having the sides thereof most vulnerable to puncture reinforced by laminations of fabric, including laterally-extending ribs carried at the edges of its reinforced sides to minimize danger of damage to the expansible sides when in both inflated and collapsed positions.

Another object is to provide an inflatable float having means inseparably formed at one of its ends for the attachment of a net, anchoring line or the like, and adjacent its opposite end a valve for the controlled introduction and release of air, whereby the valve will be normally disposed above the water line when the float is in use to facilitate control of the pressure therein, as well as of its buoyancy, without disturbing its relationship with the object to which it is connected.

Other objects and corresponding advantages such, for example, as durability, economy of construction, and efficiency in use, will be apparent to those of skill in the art from an examination of the following description read in the light of the accompanying drawing, in which—

Fig. 1 is a perspective view of my invention collapsed as when not in use;

Fig. 2 is an elevation showing the float inflated and positioned for use;

Fig. 3 is a plan view of the invention as shown in Fig. 2;

Fig. 4 is a sectional view taken on lines 4—4 of Fig. 1.

Referring to the drawing in detail, the numerals of which indicate similar parts throughout the several views, 5 designates generally an inflatable container comprising a pair of normally flat, prolate segments 6, composed of laminations of rubber 7 and fabric 8 (Fig. 4). Segments 6 are arranged to form opposite sides of a prolate spheroid. A pair of expansible walls 9 provide the other two opposite sides of the container, each having a shape similar to segments 6. The edges of the inside surfaces of the segments are vulcanized to the edges of the inside surface of the expansible walls. While preferably made very flexible, the segments are more rigid than walls 9, due to their lamina of fabric.

Corresponding ends of segments 6 are extended slightly as at 10 and are vulcanized together. A hole through these extensions is lined with an eyelet 11 for the attachment of a line or other means to maintain position of the container as an indicator or for the support of heavier objects as a fish net. Adjacent one end of one of segments 6, opposite to its end in which eyelet 11 is located, a valve 12 of any well known type is provided through which air or other fluid may be injected to inflate the container.

The introduction of the fluid into the container separates its walls and segments, forming a prolate spheroid, the edges of each segment being vulcanized with the edges of the inside surfaces of each wall 9, form laterally extending equispaced ribs 13. Ribs 13 overhang and protect segments 6 and particularly the walls 9 against abrasion, puncture or other damage by the sides or decks of boats with which the floats are positioned, or from other careless handling. The pressure within the container when the same is inflated, in tending to straighten the walls and segments, minimizes the difference in their rigidity, resulting in a substantially diagonal position of ribs 13 with respect to the body of the container. The release of pressure by the opening of valve 12 reduces this tendency and enables the segments by their greater strength of resilience over that of walls 9 to straighten, which folds the walls in between the segments as the container collapses (Fig. 4). To facilitate folding of the float with segments 6 relatively parallel (Fig. 1), creases 14 are formed in the longitudinal center of each of the walls.

While a preferred embodiment of my invention has been described and illustrated, it will be understood that numerous changes in design, size, proportion, and, in some particulars, the structural relationship, of the parts may be made without departing from the spirit of my invention.

What I claim and desire to secure by Letters Patent is:

1. A buoy comprising an inflatable container, said container consisting of a pair of oppositely disposed expansible and longitudinally extended rubber walls and two opposed walls composed of laminations of rubber and fabric, the edges of the inside surfaces of each of said four walls being sealed with the edges of the inside surfaces of its adjacent walls forming laterally protruding ribs on the outside of said container.

2. A buoy comprising a collapsible container having laterally protruding ribs extending longitudinally of said container, an extension of said ribs at the lower end of said container, an eyelet in said extension for the attachment of a mooring line, and a valve-controlled port in said container adjacent the opposite end thereof.

3. A buoy comprising a pair of walls, each wall being composed of laminations of rubber and fabric, a pair of expansible walls having the edges of their inside surfaces sealed to the edges of the inside surfaces of each of said first mentioned walls so as to form a hermetically sealed container, means at the lower end of said container for the attachment of a mooring line, and a valve at the opposite end of said container for the control of air pressure therein.

4. In a buoy, an airtight container formed of four flexible walls, two of the opposed walls of said container being of lesser rigidity than the other two opposed walls, the edges of the inside surfaces of each of said walls being sealed with the edges of the inside surfaces of its respective adjacent walls to compel inward folding of the walls of lesser rigidity upon deflation of said container.

5. A buoy comprising an inflatable container formed of four walls, two opposed walls of said container consisting of laminations of rubber and fabric, the other two opposed walls being of expansible material of greater flexibility than said first mentioned walls, the edges of the inside surfaces of each of said walls being sealed to the edges of the inside surfaces of its respective adjacent walls to form laterally protruding ribs when inflated and to compel the walls of greater flexibility to fold within the walls of lesser flexibility when the container is deflated, an eyelet for the attachment of a mooring line to one end of said container, and a valve controlled port for the passage of air into and out of said container adjacent the end of said container opposite to said means.

6. In a device of the character described, an inflatable container having two sides of inexpansible material, means connecting said sides composed of expansible material, and ribs formed of said means and extensions of respective sides extending laterally from said container to protect the same against damage when the container is inflated.

7. In a device of the character described, an inflatable container comprising a pair of oppositely disposed expansible rubber walls, and two opposite walls composed of inexpansible material more rigid than said expansible walls, the edges of the inside surfaces of each of said walls being sealed with the edges of adjacent walls to fold said expansible walls between said inexpansible walls upon deflation of the container.

8. In a device of the character described, a hermetically sealed prolate-spheroidal container comprising a pair of walls and a third wall of lesser rigidity than said first two walls, the inner face of the edges of said third wall being joined to the inner face of an edge of each of said first-named walls, respectively, to form a plurality of ribs extending parallel to the major axis of the container.

9. An inflatable container comprising a plurality of elliptically-shaped walls, the inner surface of the entire edge of each of said walls being secured to the inner surface of the edge of adjacent walls throughout its entire length, a series of ribs formed by the joined edges of said walls, said ribs being in abutting relation with respect to each other at diametrically opposite sides of said container.

10. An inflatable container comprising a plurality of walls, the entire edge of each of said walls being secured to the inner surface of the edge of an adjacent wall, alternate walls being of greater rigidity than the other of said walls, a series of ribs formed by the joined edges of said walls, and being in abutting relation with respect to each other at opposite sides of said container, the walls of greater rigidity being effective to turn the edges of the walls of lesser rigidity parallel to one another upon deflation of the container.

CHARLES N. MERRALLS.